United States Patent [19]

Reitemeyer

[11] Patent Number: 4,486,979
[45] Date of Patent: Dec. 11, 1984

[54] RELEASABLE GRIP-LOCK DEVICE FOR FLEXIBLE ELONGATE CONNECTORS AND STRUCTURES ACCOMMODATING LIVESTOCK

[76] Inventor: Frank J. Reitemeyer, Rowland Rte., Bruneau, Id. 93604

[21] Appl. No.: 497,502

[22] Filed: May 24, 1983

[51] Int. Cl.³ .............................................. E05F 11/04
[52] U.S. Cl. .................................... 49/347; 24/115 F; 24/115 M; 24/136 R; 49/404; 49/449
[58] Field of Search ............... 49/404, 347, 301, 449, 49/450, 322; 160/178; 24/136 R, 115 F, 115 M

[56] References Cited

U.S. PATENT DOCUMENTS

| | | | |
|---|---|---|---|
| 154,587 | 9/1874 | Davis | 49/347 X |
| 261,797 | 7/1882 | Wimer | 49/347 |
| 1,260,892 | 3/1918 | Goodman | 49/347 |
| 3,524,227 | 8/1970 | Kelly | 24/115 M |
| 3,821,865 | 7/1974 | Steinke | 49/404 |
| 4,071,926 | 2/1978 | Sweet et al. | 24/136 R |

*Primary Examiner*—Philip C. Kannan
*Attorney, Agent, or Firm*—M. Ralph Shaffer

[57] ABSTRACT

A releasable grip-lock device for flexible elongate connectors such as ropes are used, particularly, in the cattle industry. The device is especially applicable to guillotine-type doors which are raised, maintained in a raised position in rock condition, and subsequently dropped at rather precise times so as to retain cattle in enclosures. The accommodating structure includes the principal of jaws, one of which is spring-loaded, for the purpose of gripping the rope holding the door open, for example, or actuates as a feeder which serves as a detent to keep the jaws open so that a rope will slip therethrough when a door to which the rope is attached or to which the same cooperates is dropped at desired times. A control lever is incorporated for the purpose of requiring a positive situation to urge the jaws from locked to unlocked position. When the control lever is actuated, the detent automatically comes into play whereby a finger provided nestles in a slot or a recessed area of the movable jaw so as to keep the jaw out of positive engagement with the rope and pulley.

9 Claims, 5 Drawing Figures

RELEASABLE GRIP-LOCK DEVICE FOR FLEXIBLE ELONGATE CONNECTORS AND STRUCTURES ACCOMMODATING LIVESTOCK

FIELD OF THE INVENTION

The present invention relates to locks for cables, ropes and the like and more particularly, presents a releasable grip-lock device, and structural context of use therefore whereby this can be easily actuated to grip a rope passing therethrough and, alternatively, to release the same, the latter requiring a positive movement and the structure being designed so as to avoid inadvertent actuation so far as rope-release is concerned.

DESCRIPTION OF THE PRIOR ART

In the past a number of different types of simple structures have been devised for anchoring a rope. Common to this group is the customary device having oppositely extending horns for wrapping a rope thereabout in a figure 8 type of configuration so that the rope can be anchored satisfactorily. Devices are commonly found on flagpoles, on boats, or moorings and so forth. The problem with such a device is that a quick release or quick engagement really is not possible. Rather substantial amounts of time are required to wrap the rope around the device or around the pole or other object so that the same might be quickly secured and likewise quickly released. No U.S. Patents are presently known which bear upon the invention as claimed.

BRIEF DESCRIPTION OF PRESENT INVENTION

According to the present invention a frame or housing is provided with a fixed jaw and also a movable jaw, the elongate connectors such as a rope or cable passing between these two jaws. The movable jaw is spring-loaded and is actuated for retraction movement by a pivoted control arm. The movable jaw also has a side recess, indentation or detent slot which cooperates with the finger portion of an actuatable cocking lever that iself is spring-biased. Thus, the detent lock as is provided by the automatic spring thrusting in the lever is suitably present.

OBJECTS

A principal object of the present invention is to provide an improved grip-lock device for flexible elongate connectors, as well as accommodating structures therefor.

IN THE DRAWINGS

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

DETAILED DESCRIPTION OF PREFERRED EMBODIMENTS

Figure 1:
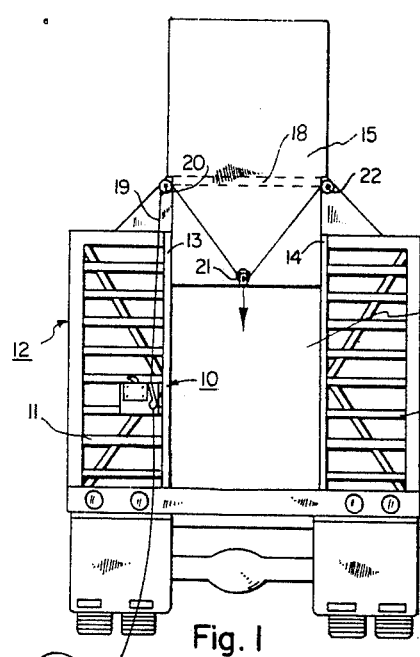
FIG. 1 is a rear-end elevation of a truck, by way of example, incorporating the device of the present invention and associated structure.
Figure 4:
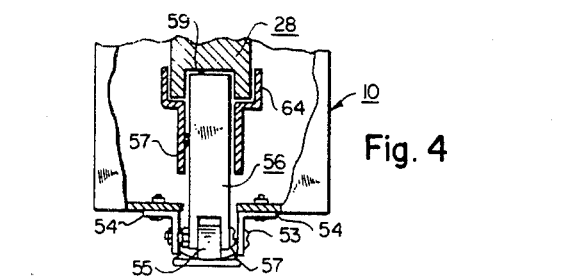
FIG. 4 is a longitudinal vertical section taken along the line 4—4 in FIG. 3.

In FIG. 1 the grip-lock device 10 is shown mounted by means to the rear-end panel 11 of truck 12. Opposite panels 11 and 11' are provided with mutually-facing, interior, channel members 13 and 14 which slidably receive door 15. Door 15 is a guillotine-type operated door which descends for closure over opening 16 of the truck. It is raised within framework 17, comprising opposite channels 13 and 14 and top channel 18, this by the use of a flexible elongate connector or member 19 that is routed over pulleys 20 and 21 and is secured to pulley or other fixed means 22. The flexible elongate connector 19 proceeds through the grip-lock device 10 in the manner hereinafter to be described. The purpose of the grip-lock device 10 is to secure the rope or other flexible elongate connector 19 when the door 15 is in its raised condition. By suitable acutation of grip-lock device 10, the same may be actuated to release the flexible elongate connector so that the door 15 will immediately fall to a closed position.

Housing 23 of the grip-lock device 10 includes a frame 24 that is backed on opposite sides by side plates 25 and 26. These may be secured together by customary bolts 27, four in number and three being shown in FIG. 3. The bolts may secure the side plates to the frame and also the device to the truck, as may be desired. Movable jaw member 28 is provided with a threaded apertures 29 that threadedly receives the threaded shank 30 of bolt 31. The latter has a headed end 32 which is covered by a dust cover 33. Dust cover 33 may comprise simply a cylindrical portion 34 having a wrench-receiving head 35 and being threaded at end 36 to thread into the threaded aperture 37 of the frame. Bolt 31 is provided with a compression spring 38 which abuts washer 39 that coacts with adjustment nut 40, the latter being threaded on the threaded shank 30 of the bolt. Movable jaw member 28 includes a serrated jaw extremity 41 facing the serrated jaw edge 42 of fixed jaw means 43. The control arm 44 is provided and is pivoted by attachments 45 to upstanding bracket 46 affixed to and associated with the frame of the device. Control arm 44 includes pivoted pulley wheel W and links 47, one on each side, which are pivotally secured by pivot attachments 43' to movable jaw member 28 and also pivoted via attachment means 49 to the center portion 40 of the control arm. Lever means 51 comprises a lever 52 which is pivotally attached and fulcrumed at 53 to upstanding bracket 54 of the frame. The forward end of the lever at 55 is secured to a finger 56 by pivot means 57. Finger 56 proceeds through a finger-guide aperture or passageway 57' so that the finger will approach and, by the spring pressure of spring 58, thrust toward the movable jaw member 28.

Movable jaw member 28 includes a depression, notch or recess at 59 that selectively receives the end 60 of finger 56. The biasing spring 58 may be disposed over a pin 61 that is secured in place by nut means 62. In any event, the action of the spring is to thrust upwardly, and into the device, the finger 56. The flexible elongate member such as a rope or cable is seen at 19. If desired, a welded frame subportion as at 64 can be employed with a cross-arm 65 having aperture 66. The latter will be provided with a rim 67 that can serve as a guide aperture bearing for the bolt which moves axially longitudinally, slightly, back and forth in accordance with the operation of the device.

Figure 2:
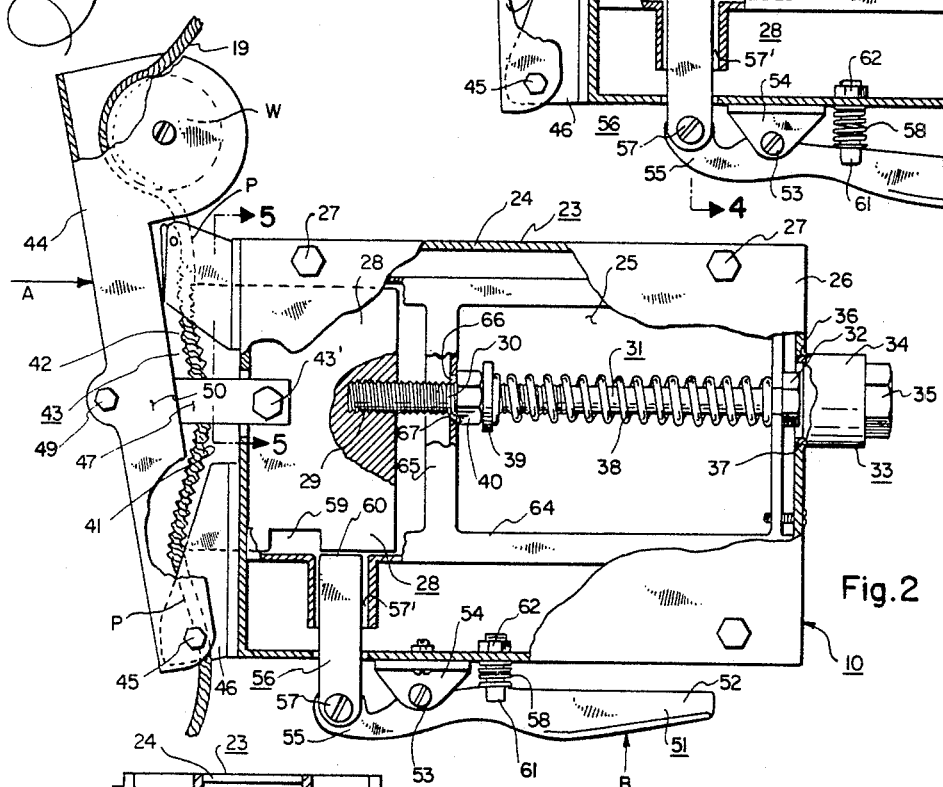
FIG. 2 is an enlarged frontal elevation of the control device of FIG. 1, rotated 180° about its horizontal axis for convenience of illustration, and is shown broken away for purposes of clarity.
Figure 5:
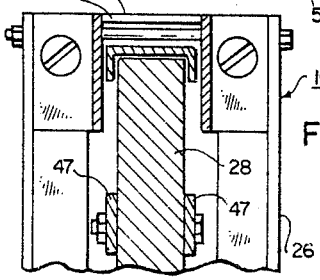
FIG. 5 is an enlarged detail and comprises a section taken along the line 5—5 in FIG. 2.

FIG. 2, again, illustrates the jaw structure as being closed so as to grip tightly against slippage the flexible elongate member 19. When the cowhand has urged cattle into and through the gate and desires the door 15 to close downwardly, then he need only thrust the control arm 44 in the direction A so that the links at 47 will urge downwardly movable jaw member 28 such that the notch or depression 59 comes into alignment with finger 56. At this point the spring pressure pressing downwardly on the right portion of lever 51 will cause the finger 57 to proceed upwardly into the notch 59, see FIG. 3, so as to releasably retain the movable jaw member 28 in a position spaced from the fixed jaw member 43. Accordingly, the juncture J between the serrated jaw extremity of the movable jaw member and the serrated jaw edge of the fixed jaw means and comprising a portion of elongate connector passageway P, becomes widened in the condition of FIG. 3, whereby to permit the flexible elongate member to slip and thus allow the door to drop under the latter's own weight. This serves to close the entrance 16. Accordingly, the jaws are locked in open position when the finger 56 engages the notch or depression 59.

Figure 3:
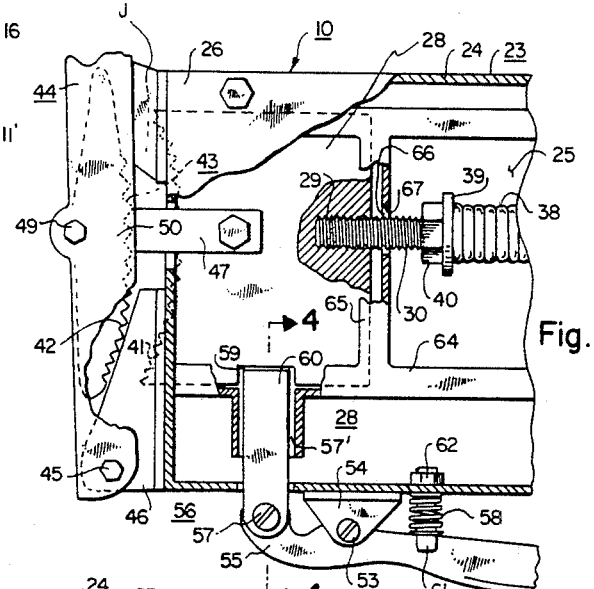
FIG. 3 is a fragmentary view, similar to FIG. 2, but illustrates the jaw structure as being open rather than closed in the case of FIG. 2.

The cowhand can easily open the door by again simply pulling on the rope or flexible elongate connector, when the device is shown in the condition seen in FIG. 3, this until the door achieves the uppermost position desired. At this point the cowhand simply pushes upwardly on the lever means 51 in the direction of arrow B in FIG. 2 so that the pressure of spring 38 will be sufficient to return to closed position, in a direction to the left, the movable jaw member 28. Thus, in effect the actuation upwardly in the direction B in FIG. 2 of the lever serves to release the detent previously applied to the movable jaw member. Upon such release the movable jaw member immediately proceeds quickly to the left so as immediately to thrust and grip, with the fixed jaw means, the flexible elongate connector 19 contained between the two. Thus, the door is locked in position at 15 as shown in FIG. 1 until the user againg kicks to the right in the direction A the control arm 44. Adjustment nut 40 is used to adjust the tension of the spring and hence the force required to move control arm 44 to the left when the detent is being approached.

It is noted that a positive and intentional force is needed to open the jaws and hence to release the rope. This is the purpose of the control arm being on the side, preferably on the left. To achieve a relock the user need only lift upwardly on the right hand portion of lever means 51 in FIG. 2.

Accordingly, the present invention in the way of the grip-lock device and the associated structure of FIG. 1 provides a way for retaining, in any enclosure, be the same truck 10, feed lot structure, truck and so forth.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination: a frame having a transversely oriented finger-guide aperture; a movable jaw member disposed in said frame, having a serrated jaw extremity at one extremity and a bolt-receiving threaded aperture at the remaining extremity, and provided with a finger-receiving side indentation at a side thereof; spring-biased lever means pivotally fulcrumed to said frame and provided with finger means passing through said finger-guide aperture for selective engagement with said indentation; fixed jaw means mounted to said frame over said movable jaw member and having a serrated jaw edge facing said serrated jaw extremity of said movable jaw member; a control arm pivoted to said frame and having link means mounted to said movable jaw member, whereby depression of said control arm operates, via said link means, to depress said movable jaw member and thereby move said movable jaw member away from said fixed jaw means and permit said finger to come into engagement with said depression so as to releasably lock said movable jaw members in open position relative to said fixed jaw means; a bolt having a headed end retained by said frame and a threaded shank threaded into said threaded aperture of said movable jaw member; and spring means disposed within said frame over said bolt shank for operating to thrust forwardly said movable jaw means toward said fixed jaw member, whereby to lock an external elongate member disposed therebetween, upon said finger being withdrawn from said depression through actuation of said lever means.

2. The apparatus of claim 1 wherein said control arm is provided with a journaled pulley wheel and has a passageway over and through which said external elongate member can be routed.

3. The apparatus of claim 1 wherein said frame has a cap-configured dust cover removably secured to said frame and dimensioned to accommodate axially-translational displacements of said bolt.

4. The apparatus of claim 1 wherein said bolt is provided at said bolt shank with a spring-tension adjustment nut cooperable with said spring means.

5. The apparatus of claim 1 wherein said movable jaw member and fixed jaw means are mutually configural such that said serrated jaw extremity and said serrated jaw edge face each other at a curved space-juncture.

6. The apparatus of claim 1 wherein said frame is provided with opposite side enclosure plates.

7. Structure fore selectively gripping and also for selectively releasing an external elongate member, said structure being provided a frame; spring-biased movable jaw means mounted within said frame; fixed jaw means secured to said frame and cooperable with said movable jaw means for releasably gripping said external elongate member when disposed therebetween; actuatable means for selectively releasably locking said movable jaw member away from said fixed jaw means; and actuatable control means for depressing said movable jaw member, whereby said releasable locking can be effectuated.

8. In combination: a guillotine-type door; fixed structure provided a frame slideably mounting said door and having at least one pulley; flexible elongate means secured over said pulley and cooperable with said door whereby to raise the same upon the pulling of said flexible elongate means; and a releasable gripping device secured to said fixed structure and receiving said flexible elongate means, said gripping device including: spring-biased jaw means for selectively gripping said flexible elongate means; means for selectively positively opening said jaw means in cocked position; and control means for uncocking said jaw means whereby to grip said flexible elongate means.

9. In combination: a guillotine-type door; fixed structure provided a frame slideably mounting said door and having at least one pulley; flexible elongate means secured over said pulley and cooperable with said door whereby to raise the same upon the pulling of said flexible elongate means; and a releasable gripping device secured to said fixed structure and receiving said flexible elongate means, said gripping device comprising: a frame; a spring-biased movable jaw member within said frame, said jaw member being movable solely transversely relative to the longitudinal orientation of said flexible elongate means; a fixed jaw means secured to said frame and cooperable with said movable jaw member for mutually releasably gripping said flexible elongate member; actuatable means for selectively releasably locking said movable jaw member transversely away from said fixed jaw means; and actuatable control means for transversely depressing said movable jaw member whereby said releasable locking can be effectuated.

* * * * *

UNITED STATES PATENT OFFICE
CERTIFICATE OF CORRECTION

Patent No. 4,486,979        Dated Dec. 11, 1984

Inventor(s)   Frank J. Reitmeyer

It is certified that error appears in the above-identified patent and that said Letters Patent are hereby corrected as shown below:

On the title page;
The spelling of the last name of inventor should read

-----REITMEYER----- at both occurrences at page 1.

Signed and Sealed this

Twenty-third Day of July 1985

[SEAL]

Attest:

DONALD J. QUIGG

*Attesting Officer*    *Acting Commissioner of Patents and Trademarks*